No. 619,839. Patented Feb. 21, 1899.
Z. F. POTTER.
FILTER.
(Application filed Oct. 15, 1897. Renewed Jan. 20, 1899.)
(No Model.) 4 Sheets—Sheet 1.
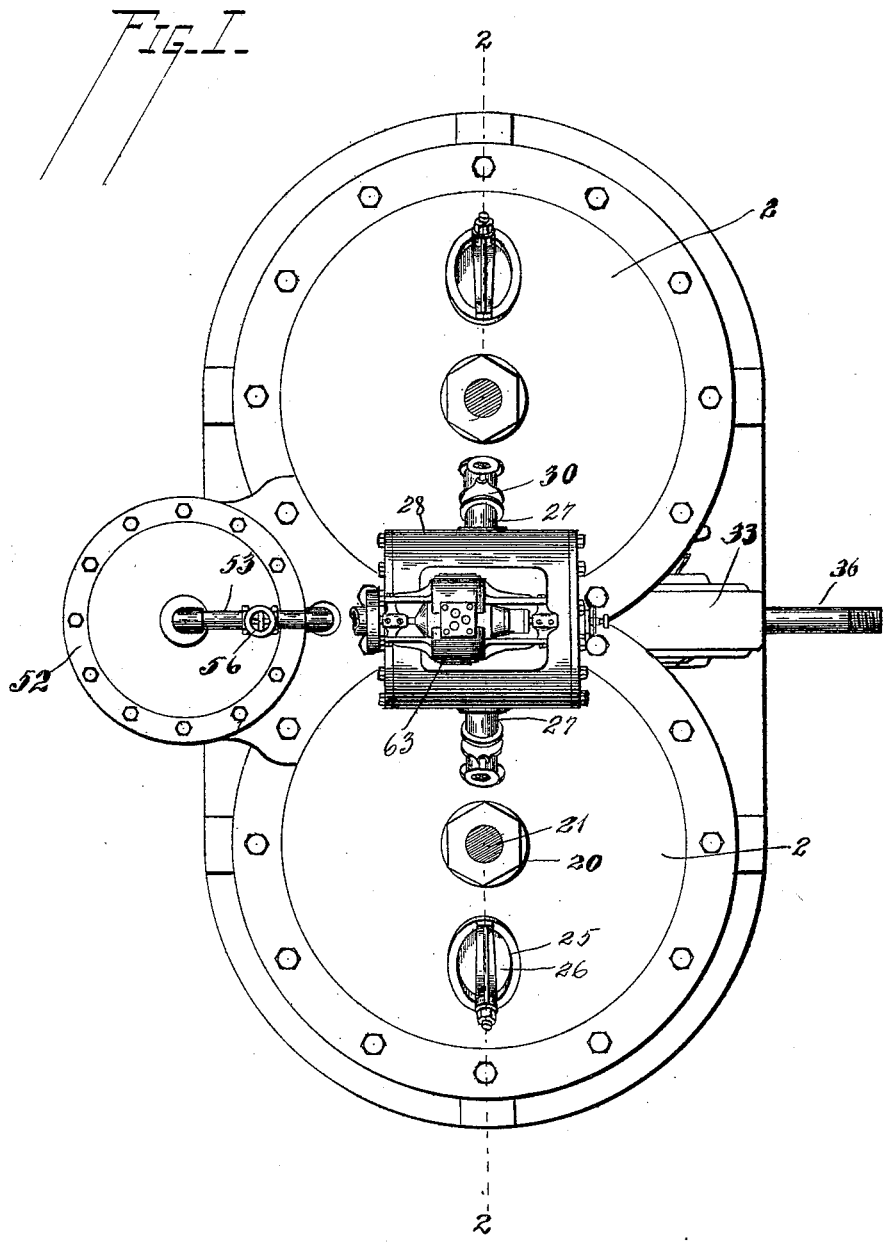
Fig. I.
Witnesses
G. C. Conner
Victor J. Evans
Inventor
Zoroaster F. Potter
by V. L. Stockbridge
Attorney

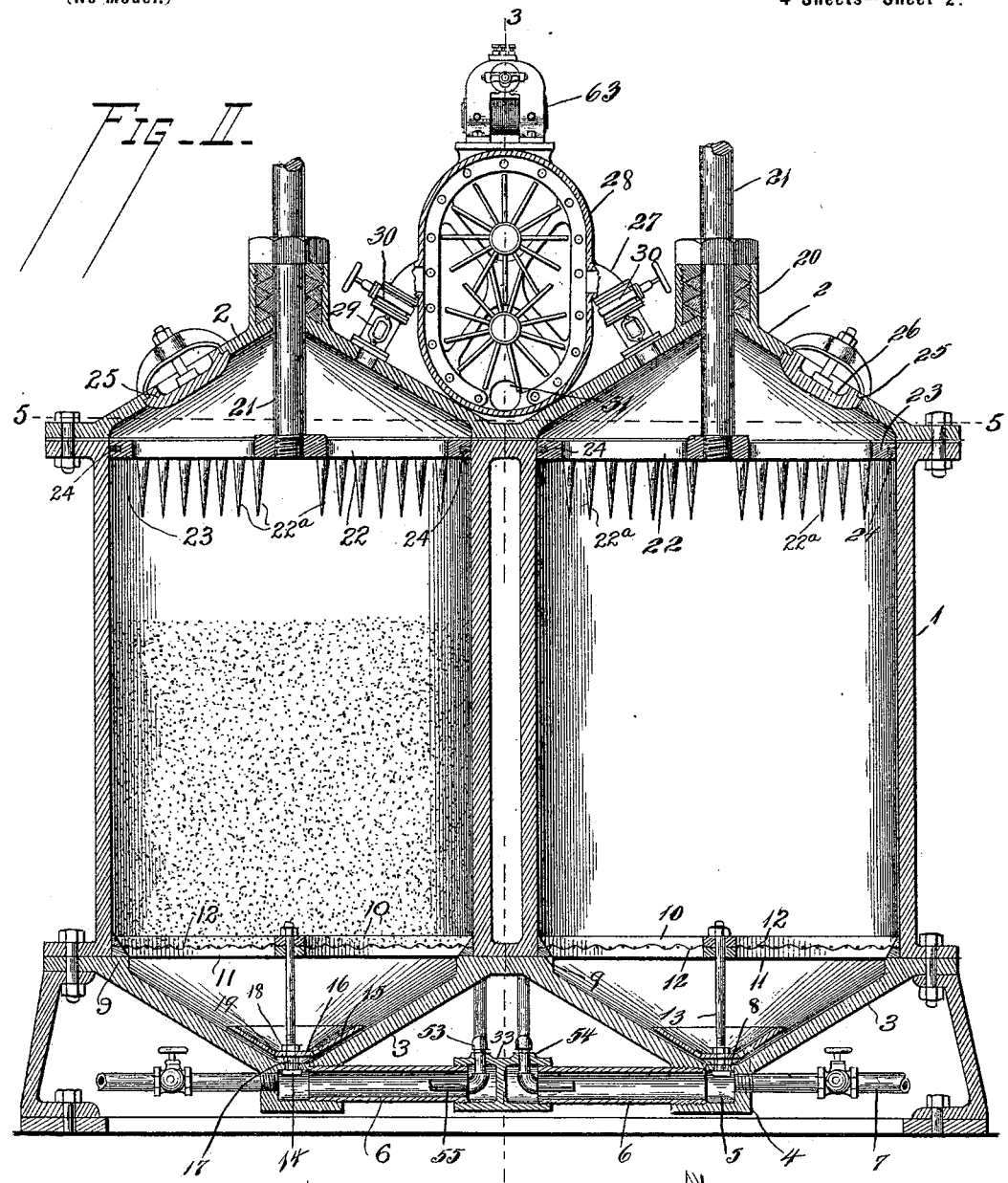

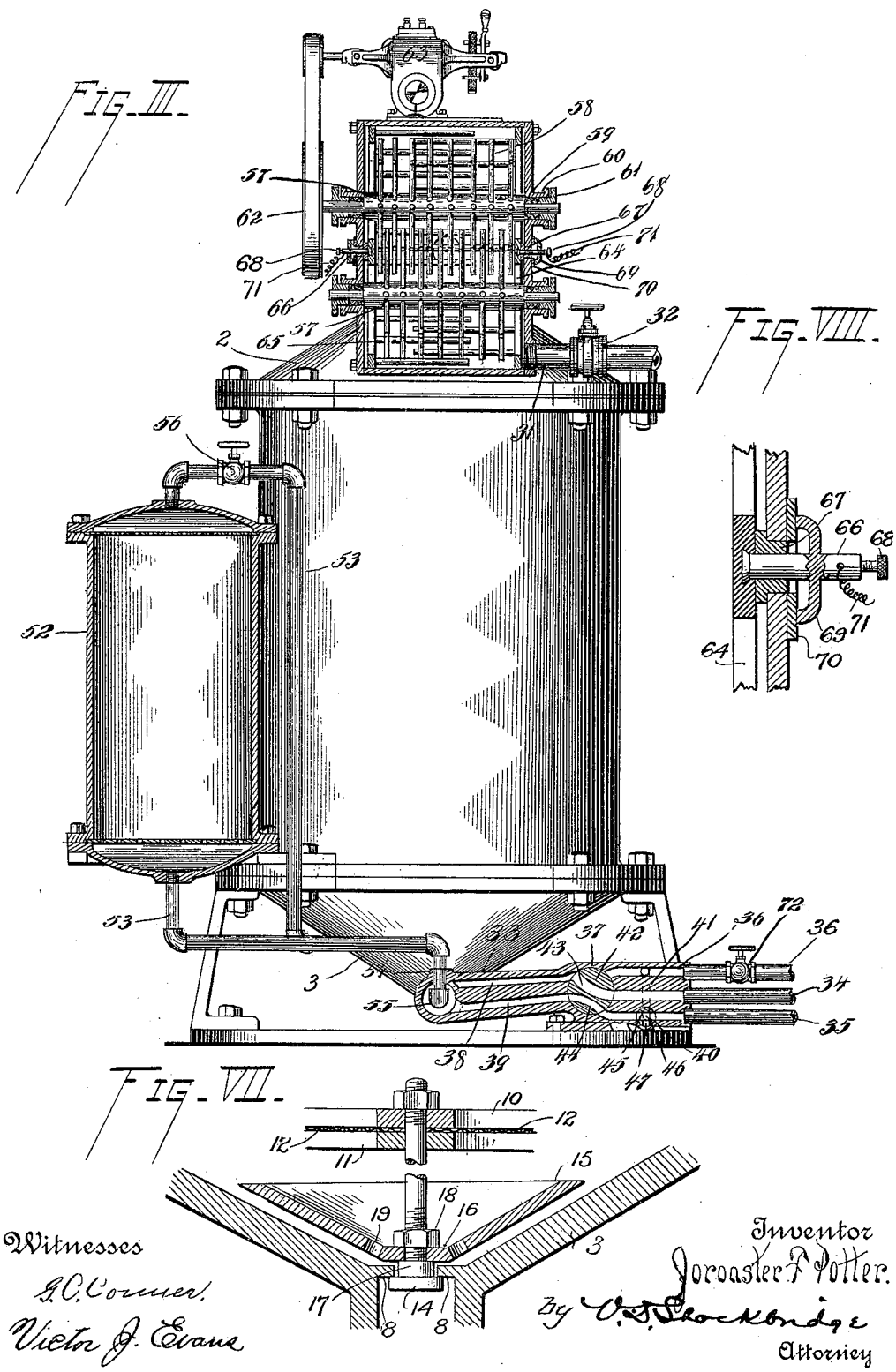

No. 619,839. Patented Feb. 21, 1899.
Z. F. POTTER.
FILTER.
(Application filed Oct. 15, 1897. Renewed Jan. 20, 1899.)
(No Model.) 4 Sheets—Sheet 4.
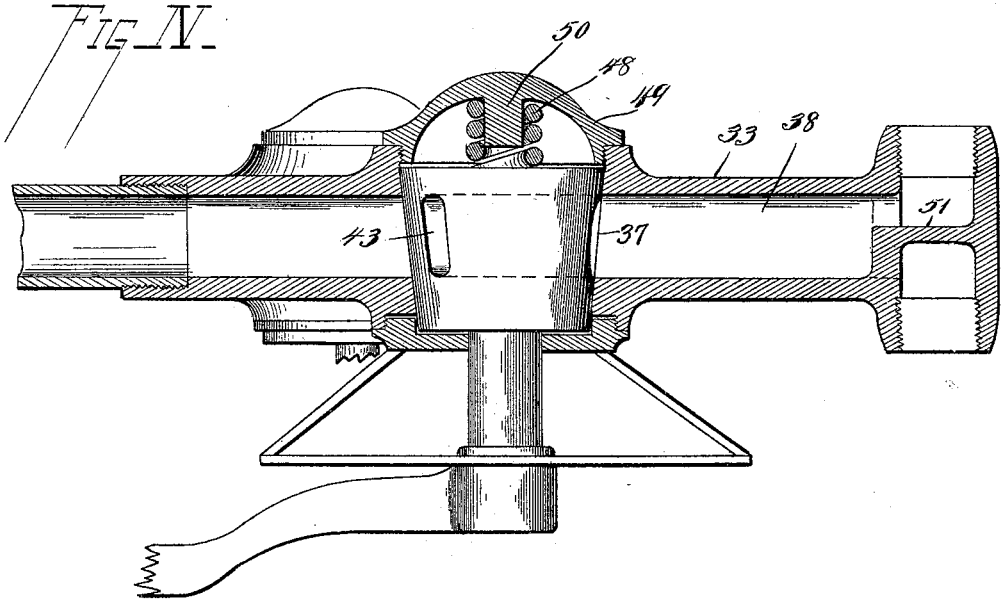
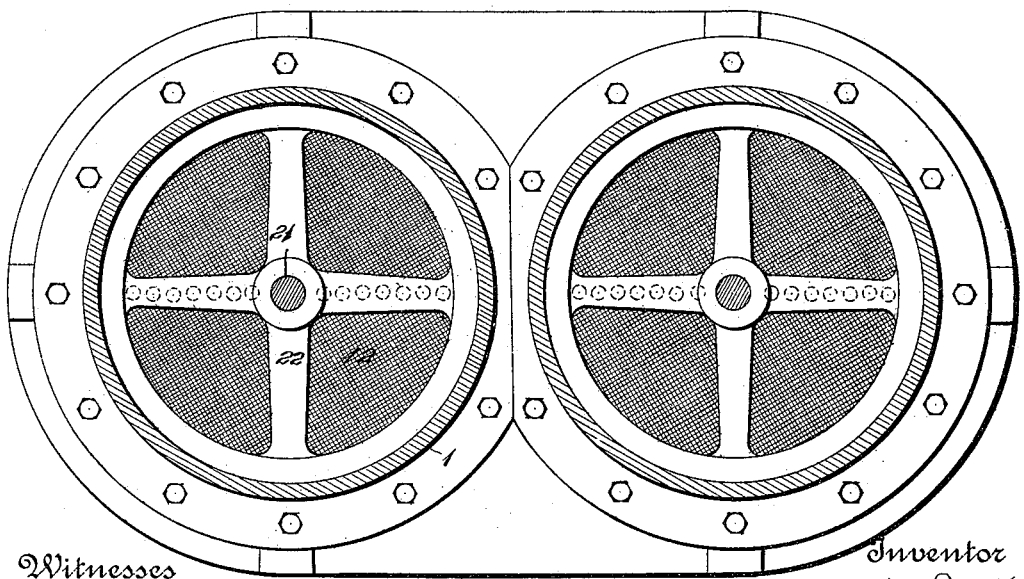

UNITED STATES PATENT OFFICE.

ZOROASTER F. POTTER, OF BALTIMORE, MARYLAND, ASSIGNOR TO THE BALTIMORE FILTER COMPANY, OF SAME PLACE.

FILTER.

SPECIFICATION forming part of Letters Patent No. 619,839, dated February 21, 1899.

Application filed October 15, 1897. Renewed January 20, 1899. Serial No. 702,848. (No model.)

*To all whom it may concern:*

Be it known that I, ZOROASTER F. POTTER, a citizen of the United States, residing at Baltimore city, in the State of Maryland, have invented certain new and useful Improvements in Filters; and I do hereby declare the following to be a full, clear, and exact description of the invention, such as will enable others skilled in the art to which it appertains to make and use the same.

This invention relates to filters, and has for its object to provide an efficient filter that will effectually filter and remove the bacteria, while it is also arranged so that the filter-bed can be readily scoured and cleaned.

With these and other useful ends the invention consists in the features of construction hereinafter fully described and specifically claimed.

In the accompanying drawings, forming part of this specification, Figure 1 is a top plan view of a filter constructed in accordance with this invention with certain parts in horizontal section for convenience of illustration. Fig. 2 is a central vertical section taken on the line 2 2 of Fig. 1. Fig. 3 is a vertical section taken on the line 3 3 of Fig. 2. Fig. 4 is a horizontal section through the valve-casing. Fig. 5 is a horizontal section taken on the line 5 5 of Fig. 2. Fig. 6 is a sectional detail of one of the heads, showing one form of filter-bed support. Fig. 7 is an enlarged sectional detail of the suspended deflection-plate. Fig. 8 is an enlarged sectional detail of one end of the electrical device.

The filter forming the subject of this invention comprises two casings that communicate with each other and through which the water passes, while only one of the casings is provided with a filtering-bed. This bed is interchangeable—that is to say, it can be removed from one casing to the other for the purpose of cleansing the same—while means are provided for acting upon the mass forming the filter-bed during its transfer for thoroughly cleansing it. Means are also provided to control the entrance and exit of the water, so as to lead the same to these casings in opposite directions and also to carry the water to waste when it is not desired to send it through the filtered-water pipe.

Referring now to said drawings, 1 indicates the filter-casings, which are cylindrical in their general contour and provided at their upper and lower ends with cone-shaped heads 2 and 3. The lower head 3 of the casing is provided at its lower end with a boss 4, forming a pocket 5 in line with the axial center of the casing, and which boss is provided at opposite ends with ports to receive the pipes 6 and 7, said pipe 6 serving to lead the water into or out of the lower end of the casing, while the pipe 7 serves as a drain-pipe when it is desired to empty the casing. The sides of the pocket 5 in said boss are provided with lugs 8, hereinafter referred to. The lower head 3, where it joins the casing 1, is provided with a shelf or upwardly-facing shoulder 9, upon which rests a strainer 10. The said strainer consists of two grates 11, between which is situated a sieve 12. To avoid an upwardly-facing shoulder within the interior of the casing upon which particles can collect, the outer pieces or rings of the grates are constructed as shown in Fig. 2—that is to say, the ring of the lower grate is the same width at its lower edge as said shelf 9, while its inner face inclines outwardly, and the ring of the upper grate is triangular, with its inner face in alinement with the inner face of the lower ring, so that the inner faces of the grates extend from from the inner face of the casing above the same to the inner edge of the shelf or shoulder 9. The said strainer is held within the lower end of the casing, in the position shown, by means of a pin 13, the upper end of which passes through the centers of the grates and is held by a nut, while the lower end of this pin is provided with lateral projections 14. The length of said pin is such that when the strainer rests upon the shoulder 9 the projection 14 at the lower end of the pin extends below the lugs 8 of the head 3, so that the pin can be inserted between these lugs and then given a quarter-turn to cause them to engage the lug, after which by screwing up the nut at the upper end of the pin the grates are held firmly in position. Between the strainer and the lower head of the casing is a conical deflecting-plate 15, that is carried by the pin 13 and stands a little distance away from the inner face of the lower head, as shown. This conical deflecting-plate 15 is provided with a flat central portion 16, that is apertured to allow the pin 13 to extend therethrough, while near its lower end said pin is provided with a projection or shoulder 17, upon which the deflecting-plate rests. Just above the shoulder 17 said pin is screw-threaded to receive a nut 18 for holding the deflecting-plate rigidly upon the pin. The said conical deflecting-plate extends outwardly to a point near the sides of the head, while near the center of the same are a plurality of openings 19 to allow a portion of the water to pass. In this way it is seen that in transferring the bed from one casing to another, which is accomplished by forcing the water into the bottom of the casing, this water is distributed throughout the entire cross-section thereof, so that the bed is lifted evenly, it being noted that part of the water passes through these openings 19 near the center of the bed, while the rest passes outside of the edges of the deflecting-plate. The upper head 2 of the cylinder is provided at its center with a stuffing-box 20 to receive the stem 21 of a wiper 22. This wiper is situated within the casing and secured to the lower end of the stem 21 and consists of a ring 23, connected with a hub by spokes, while a flexible strip 24 of rubber or the like is fastened to the outer sides of a ring and passes over the inner face of the casing, so as to remove impurities that may adhere thereto, it being noted that the normal position of said wiper is at the upper end of the casing. The upper head of the casing is also provided with hand-holes 25 and the removable covers 26 in a familiar manner, by means of which access can be had to the interior thereof without removing the head. The heads 2 of both casings communicate with each other by means of a pipe or faucet 27, that extends between the heads 2 thereof, as shown in Fig. 2, while a chamber 28 is interposed between the ends of said pipe 27 and which will be referred to specifically hereinafter. This chamber 28 is provided with means for thoroughly agitating and cleansing the filtering medium as it passes from one casing to another through the pipe 27, as well as having suitable electrodes for subjecting the water to an electrolytic action. This pipe 27 is provided at one side with openings 29, consisting of pieces of glass fastened over openings in opposite sides of the pipe, by means of which the condition of water passing through the pipe can be observed, so as to determine when the entire filtering-bed has been transferred. On each side of the chamber 28 the said pipe 27 is provided with the gate-valve 30, while the lower end of the chamber is provided with an outlet-port 31, that is controlled by a gate-valve 32. This outlet-port 31 is for the purpose of removing the filtering medium from the filter without removing the heads from the casing, and by closing the gate-valve adjacent to the casing that is emptied or does not contain the filtering-bed, opening the gate-valve 32 and sending the current of water into the lower end of the casing containing the filtering-bed, it is seen that said bed is raised and passes through the pipe 27 into the chamber and out through the port 31 into a suitable waste-pipe.

The means for subjecting the water as it passes through the chamber to electrolysis, as well as for agitating and cleansing the same, will be described hereinafter, while the means for controlling the passage of the water, as well as for admitting thereto oxid of iron, will now be described.

The pipes 6, leading from the lower ends of the heads, extend inwardly, as shown, and communicate at their inner ends with the valve-casing 33. This valve-casing is provided on opposite sides with separate ports to communicate with the pipes 6, while the opposite end of the casing is provided with three ports—namely, an inlet-port 34 for the supply, an outlet-port 35 for the filtered water, and the outlet-pipe 36 for the washout or waste. The said casing 33 is provided with a main-valve chamber 37, with which each of the passages or ports 34, 35, and 36 communicate, while the two ports 38 and 39 also communicate therewith. Within the passage 35 is an auxiliary-valve chamber 40, while a passage 41 leads from the waste-passage 36 to the said valve-chamber 40. The main valve 42 is provided with two ports 43 and 44, extending therethrough, while the auxiliary valve 45 is provided with a direct passage 46, having a lateral passage 47 extending from about the center thereof. The passage 44 of the main valve serves to establish communication between the passages 35 and 39 when the passage 43 communicates with the passages 34 and 38. When this main valve is reversed, the passage 44 communicates with the passages 36 and 38, and 43 with the passages 34 and 39. The auxiliary valve 45 can be turned so that it establishes communication between the passages 35, 44, and 39, while it can be also turned to connect the end of the passage 35 with the passage 41.

The small ends of the valves 42 and 45 are provided with the usual handles, and the valves are tapered, as shown. These valves are held in place by springs 48, that are held against the valves by caps 49, that screw into the ends of the valve-chamber and are provided with central inwardly-extending bosses 50 to receive the spring. In this way the valve is held against its seat under tension, while the cap 49 also serves to receive a lubricant, such as tallow.

The end of the valve-casing 33 with which the pipes 6 communicate is provided with an upright partition 51, dividing the same vertically, while the passages 38 and 39 communicate with opposite sides of this partition 51. (See Fig. 4.) The said valve-casing 33 is situated on one side of the filter, with its inner end extending inwardly to about the center thereof, while the pipes 6 enter from each side, since they extend radially from the center of the casing. On the opposite side of the filter and between the casings is a cylinder 52, from the upper and lower ends of which pipes 53 extend, which enter the pipes 6 and have nozzles extending outwardly within said pipes. These pipes 53 enter through the bosses 54 on the rear end of the valve-casing 33 and extend downwardly, where they are provided with lateral extensions 55, extending outwardly and into the pipe 6. The said cylinder 52 is filled with filings or other small particles of iron, and it is seen that when the filter is in operation and the water is passing into the lower end of one casing and out of the lower end of the other it will cause a current through this cylinder 52 and carry the oxids of iron into the pipe that is feeding water to the lower end of a casing, so that these ingredients are injected into the water before it is filtered. A valve 56 is placed within one of the pipes 53 and serves to stop the current through the cylinder 52.

It is understood, of course, that the interior of the chamber 28 and the pipe 27 is lined with porcelain or other non-conducting material, and, furthermore, that the inner surface of the filter can be so constructed. The said chamber 28 is provided with flat sides through which extend rotatable shafts 57. These shafts are provided with laterally-extending fingers 58, arranged in parallel series, while the shaft and the fingers are also covered with porcelain. These shafts, with their fingers, constitute rotatable brushes. The ends of the shaft are reduced and extend through openings 59 in the sides of the chamber and are protected by stuffing-boxes 60, it being noted that the enamel or porcelain layer or insulated portion extends outwardly and beyond the inner face of the chamber, so that the packing-gland 61 forces the packing between this enamel or insulated portion. The reduced end portion of the shaft 57 forms the journal-shaft, and the packing-gland 61 receives these journals and forms the bearing. The radial fingers 58 of the upper and lower shafts are so constructed that as they are rotated they pass between each other. The upper shaft 57 is provided on the outside of the chamber with a pulley 62, by means of which it can be driven, a convenient device for this purpose comprising an electric motor 63, that is mounted upon the upper end of the chamber in the manner shown. When the current of water is reversed in the filter to carry the filtered water from one chamber to another and through this chamber 28, the upper shaft is rotated, so that the fingers of the two shafts act upon the filtering medium to thoroughly agitate the same and to throw the particles of the filtering medium in contact with each other and by impact to cleanse the same of impurities, while the contact between these rotating fingers and the particles of the filtering medium also serves to thoroughly agitate them, whereby the impurities are loosened and can be carried away. As referred to, the water is subject to electrolysis when passing through this chamber 28, and to effect this the sides of this chamber are provided with plates 64, having inwardly-extending fingers 65. These plates are situated on opposite sides, and the fingers overlap at the center of the chamber. The fingers, furthermore, extend around the lateral fingers of the shafts, while the plates are held in position by bolts 66, secured to the outer side of the plate and passing through openings in the sides of the chamber. To insulate the said plates from the sides of the chamber, a packing-washer 67 surrounds the bolt 66 and is provided with a shoulder that rests against the inner face of the side plate of the chamber, surrounding the opening therein. The outer end of the bolt 66 is screw-threaded to receive the nut 68, said nut having a peripheral flange 69, that rests against an insulating-washer 70 upon the outer face of the side plate of the chamber. The outer ends of the bolts 66 serve as the electrodes of the plates, and the circuit-wires 71 are connected therewith in the manner shown. The same current that is used to run the motor can be sent through these circuit-wires 71 by the use of a suitable switch. The current of electricity is passed through these fingers 65 when the water is being filtered and not only subjects the water to electrolysis, but acts upon the oxid of iron that is introduced into the water from the chamber 52 in such a manner that it is precipitated more readily upon the filtering-bed, it being noted that the oxid of iron is introduced into the water to obtain a coating or layer upon the surface of the filtering-bed to arrest the bacteria.

The manner in which the filter is operated will now be described. It is supposed, for instance, that the valve is in the position shown in Fig. 3. The supply enters the passage 34, passes through the main valve to the passage 38, and then through the pipe 6 into the bottom of the empty casing. This water carries with it the oxid of iron and passes upwardly through the empty casing and into the other casing, being acted upon by the current of electricity passing between the fingers 65 in the chamber 28. It then passes down through the filtering-bed in this latter casing and out through the bottom thereof and into the passage 39 of the valve-casing. It then passes through the main valve and auxiliary valve and out through the filtering-passage 35. When it is desired to clean the filter-bed and to transfer it into the other casing, the main valve is turned so that the passage 43 extends between the inlet-passage 34 and the passage 39, thus reversing the direction of the current in said passage 39. The passage 44 then extends between the passage 38 and waste-passage 36. The auxiliary valve is not turned, so that the water passes from the supply-passage into the bottom of the casing containing the filtering medium, lifting this medium and carrying it through the chamber 28, wherein the shaft and radial fingers are located, and into the former empty casing, while the water passes down through the bottom of this last-mentioned casing into the passage 38 and then out through the waste-passage. It is continued in this manner until the bed has been deposited and the impurities carried off, this being noted by a suitable sight that can be placed within the waste-passage. As soon as the water that is now filtering through the newly-deposited bed is clear a valve 72 is closed to close the waste-pipe, while the auxiliary valve is turned to bring one end of this passage 46 into alinement with the lower end of the passage 41 and the end of this lateral passage 47 in communication with the outer end of the passage 35, which throws the filtered water again into the correct channel, it being noted that the first filtered water is carried to waste in the approved manner. It is understood, of course, that by reversing this operation the bed can be again transferred when it is again desired to wash the same, although it is obvious that the bed can be transferred several times, if necessary, before filtering. The wiper 22 is used just before the washing or transfer of the bed or at any other time that is found convenient. For instance, the stem can be depressed and then raised, so that the flexible wiping-strip scrapes over the inner surface of the empty casing to loosen and remove any impurities that may adhere thereto preparatory to changing the current of water and washing.

The lower portion of the filter-bed, for which purpose I preferably employ gravel, may be supported in any suitable manner by a screen, a gravel-pan, or other means. In Fig. 6 I have shown a novel construction of support for such lower portion of the filter-bed. This comprises the pan 73, having the reticulated bottom 74 and the vertical wall 75, which is adapted to fit snugly within the lower end of the cylinder, resting upon the shoulder 76, and the inner face thereof being inclined from the bottom upwardly and outwardly, as seen at 77, so as to avoid a shoulder or a lodging-place at the upper edge. Around the wall 75, and preferably near the bottom thereof is an annular groove or socket 78, in which is adapted to be received the ring or gasket 79, preferably of rubber, which serves to form a tight joint and preclude the possibility of escape of liquid or the finer particles from the filter-bed, and when this pan is raised this gasket or ring serves as a wiper for the inner wall of the casing, as will be readily understood from reference to said Fig. 6. 80 is an eyebolt or ring or analogous device by means of which the pan may be raised out of the cylinder or casing when desired.

Upon the under side of the wiper 22 are downwardly-extending teeth or projections 22ª, which may be employed when desired for the purpose of agitating the lower or gravel portion of the filter-bed.

Having thus described the invention, what is claimed as new is—

1. A filter comprising two casings communicating with each other at their upper ends, a filter-bed in one of said casings only, ports at the lower ends of said casings, and means for introducing water into either of said ports and for carrying it off from the other.

2. A filter comprising two filtering-casings communicating with each other at their upper ends, ports at the lower ends of said casings, a filter-bed in one of said casings, and means for introducing water into either of said ports and for carrying it from the other of the ports and to a waste or filtered-water pipe.

3. A filter comprising two casings communicating with each other at their upper ends, a filter-bed in one of said casings only, a port at the lower end of each of said casings, a deflecting-plate situated above the port in the lower end of each of said casings, and means for introducing water into one of said ports and withdrawing it from the other.

4. A filter comprising two casings, a passage establishing communication between the upper ends of said casings, an agitating apparatus situated in said passage between the upper ends of the casings, a filter-bed in one of said casings, ports at the lower ends of said casings, and means for introducing water into one of said ports and withdrawing it from the other.

5. A filter comprising two casings, a passage for establishing communication between the upper ends of said casings, means for subjecting the water to electrolysis as it passes through said passage, ports at the lower ends of said casings, and means for introducing water into one of said ports and withdrawing it from the other.

6. A filter comprising two casings, a passage establishing communication between the upper ends of said casings, an agitating apparatus situated within said passage, means for subjecting the water to electrolysis as it passes through said passage, a filter-bed in one of said casings, ports at the lower ends of each of said casings, and means for introducing water into one of said ports and for withdrawing it from the other.

7. A filter comprising two casings, a passage for establishing communication between the upper ends of said casings, means for subjecting the water to electrolysis as it passes through said passage, a filter-bed in one of said casings, ports at the lower ends of said casings for introducing and drawing off the water, and means for introducing oxid of iron into the water before it passes through said passage.

8. In a filter, a casing having an upwardly-facing shoulder near its lower end, a strainer or sieve resting upon said shoulder, the grates of said strainer or sieve having inclined inner faces to extend from the face of the casing above the shoulder to the inclined head thereof, and means for holding said strainers or sieves upon said shoulder.

9. In a filter, a casing having a strainer or sieve resting upon a shoulder near the lower end thereof, lugs in the lower end of the head of the casing, a pin having a head at its lower end to engage said lugs and passing through said strainer or sieve, and means for connecting the said strainer or sieve and said pin.

10. In a filter, a casing having an upright pin extending from the lower end thereof, a deflecting-plate resting upon a projection on said pin, a nut upon said pin engaging the upper face of said deflecting-plate, said deflecting-plate extending outwardly to a point near the sides of the head of the casing and provided with openings near the center thereof.

11. In a filter, a casing having a cone-shaped lower end, a central upright pin, a cone-shaped deflecting-plate resting upon a projection upon said pin and held thereon by a nut engaging the upper face of the deflecting-plate, said deflecting-plate extending outwardly and practically parallel with the end of the head of the casing and to a point near the sides thereof and provided with openings near its center.

12. In a filter, a casing, a longitudinally-movable wiper situated within said casing and in contact with the inner wall thereof and provided with downwardly-extending projections, and a stem connected firmly at one end with said wiper and extending outside of the casing.

13. In a filter, a casing, a wiper situated within said casing and comprising a skeleton frame having a flexible strip at the periphery thereof to engage the inner walls of the casing and teeth projecting from its under face, and a stem firmly connected at one end to the said frame and extending on the outside of the casing.

14. A filter comprising two casings, a passage establishing communication between the upper ends of said casings, a valve within said passage to close the communication between the casings, an outlet-port in said passage, and ports in the lower ends of said casings for introducing and withdrawing the water.

15. A filter comprising two casings, a passage establishing communication between the upper ends thereof, two valves in said passage for closing the same, an outlet-port in said passage and between said valves, and ports in the lower ends of said casings for introducing and withdrawing the water.

16. A filter comprising two casings, a passage establishing communication between the upper ends of said casings, a chamber between the ends of said passage, agitating devices within said chamber, valves on the opposite sides of said chamber for closing the passage, an outlet-port at the lower end of said chamber, and ports in the lower ends of said casings for introducing and withdrawing the water.

17. A filter comprising two casings, a passage establishing communication between the upper ends of said casings, a chamber between the ends of said passage, rotatable brushes in said chamber, and ports in the lower ends of the casings for introducing and withdrawing the water.

18. A filter comprising two casings, a passage for establishing communication between the upper ends of said casings, a chamber between the ends of said passage, a rotatable and driven brush in the upper end of said chamber, a freely-rotatable brush in the lower end of said chamber, the teeth upon said brushes overlapping, and ports in the lower ends of said casings for introducing and withdrawing the water.

19. A filter comprising two casings, a passage establishing communication between the upper ends of said casings, a chamber between the ends of said passage, a rotatable driven shaft extending through the upper end of said chamber and provided with a plurality of rows of radial fingers, a freely-rotatable shaft in the lower end of the chamber provided also with a plurality of rows of radial fingers, said fingers upon the said shafts overlapping, and ports in the lower ends of said casings for introducing and withdrawing the water.

20. A filter comprising two casings, a passage for establishing communication between the upper ends of the casings, electrodes on the opposite sides of said passage, and ports at the lower ends of the casings for introducing and withdrawing the water.

21. A filter comprising two casings, a passage for establishing communication between the upper ends of the casings, electrodes situated on opposite sides of said passage and comprising a plurality of inwardly-extending fingers that overlap, and ports at the lower ends of the said casings for introducing and withdrawing the water.

22. A filter comprising two casings, a passage for establishing communication between the upper ends of the casings, a chamber between the upper ends of said passage, plates secured to the opposite sides of said chamber but insulated therefrom and provided with conducting-pins extending through and to the outside of the chamber, inwardly-extending conducting-fingers secured to said plates and overlapping each other, and ports at the lower ends of said casings for introducing and withdrawing the water.

23. A filter comprising two casings, a passage for establishing communication between the upper ends of the casings, a chamber between the ends of said casings, rotatable agitating devices within said chamber, electrodes on the opposite sides of said chamber and comprising a plurality of inwardly-extending fingers extending around the agitating members and with their inner ends overlapping, and ports in the lower ends of the casings for introducing and withdrawing the water.

24. The combination with the inlet and outlet pipes of a filter, of a valve-casing having two passages 38 and 39 communicating therewith, a valve-chamber 37 in said casing with which said passages 38 and 39 communicate, three passages 34, 35 and 36 communicating with the other side of said valve-chamber, a valve 42 within said valve-chamber having two ports therethrough, an auxiliary-valve chamber in said passage 35, a passage 41 extending between said auxiliary-valve chamber and the passage 36, and an auxiliary valve 45 in said auxiliary-valve chamber having a through-port, and a lateral port extending therefrom.

25. The herein-described process for filtering water which consists in subjecting the same to electrolysis before it passes to the filtering medium, and in introducing oxid of iron into the water before it is subjected to the electrolysis.

26. The herein-described process for filtering water, which consists in introducing and maintaining a supply of oxid of iron to the water to be filtered before it is filtered, then subjecting such water to electrolysis before it reaches the filter-bed.

27. The herein-described method of purifying water which consists in introducing a coagulant into the water before its passage to the filter and prior to electrolysis, and subsequently subjecting the same to electrolysis, substantially as specified.

28. The herein-described method of purifying water, which consists in simultaneously introducing the water and a coagulant into the casing, subjecting the same subsequently to electrolysis and subsequently passing the same to and through a filter, substantially as specified.

29. The herein-described method of arresting and removing the impurities from water during the uninterrupted passage of the same from supply-pipe to a filtering apparatus, which consists in introducing simultaneously the water and a coagulant and subsequently subjecting the same to electrolysis before it is filtered, substantially as specified.

30. The herein-described process of sterilizing water, which consists in subjecting the same after it has been supplied with coagulant to electrolysis before it is filtered, substantially as specified.

31. A support for a filter-bed, the same comprising a reticulated bottom, tapered sides and a surrounding gasket and wiper, substantially as described.

32. The combination with the head having an upwardly-facing shoulder near its lower end, of a reticulated filter-bed support resting on said shoulder and having tapered sides, and a deflecting-plate disposed beneath said support, substantially as specified.

33. A filter-bed support having reticulated bottom and vertical walls inclined upwardly and outwardly from their junction with said bottom, whereby a shoulder or projection at the upper edge is avoided, as and for the purpose specified.

34. A filter comprising two connected casings with a filter-bed in one only thereof, and having provision for the removal and replacement of its bed without disturbing the heads of the filter, substantially as described.

35. A filter comprising two connected casings with a filter-bed in one only thereof, and having provision for the removal and replacement of its filter-bed from one to the other of said casings without removal of any portion of the receptacle within which it is contained, substantially as described.

36. In a filter, a receptacle, means for the admission and egress of a liquid, means for reversing the flow of the water, and a scourer disposed exteriorly of the casing of the filter and interposed in the path of the liquid, substantially as described.

37. A multiple filter having provision for displacement of the filter-bed from one of its casings to that of another, combined with a scourer interposed between the connections between two of said casings, substantially as described.

In testimony whereof I affix my signature in presence of two witnesses.

ZOROASTER F. POTTER.

Witnesses:
WILLIAM H. SHIPLEY,
WM. L. FORD.